United States Patent
Benjamini et al.

(10) Patent No.: US 9,602,271 B2
(45) Date of Patent: Mar. 21, 2017

(54) SUB-NANOSECOND DISTRIBUTED CLOCK SYNCHRONIZATION USING ALIGNMENT MARKER IN ETHERNET IEEE 1588 PROTOCOL

(71) Applicant: GLOBALFOUNDRIES INC., Grand Cayman (KY)

(72) Inventors: Yiftach Benjamini, Givat Ela (IL); Yang Liu, Shanghai (CN); Cheng Wei Song, Beijing (CN); Kai Yang, Beijing (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/726,945

(22) Filed: Jun. 1, 2015

(65) Prior Publication Data

US 2016/0352500 A1   Dec. 1, 2016

(51) Int. Cl.
*H04L 7/00*   (2006.01)

(52) U.S. Cl.
CPC .......... *H04L 7/0037* (2013.01); *H04L 7/0012* (2013.01)

(58) Field of Classification Search
None
See application file for complete search history.

(56) References Cited

U.S. PATENT DOCUMENTS

| 7,551,646 B1 * | 6/2009 | Zhang | H04J 3/0629 370/503 |
|---|---|---|---|
| 8,635,371 B2 | 1/2014 | Kim et al. | |
| 8,873,589 B2 | 10/2014 | Aweya et al. | |
| 2013/0080817 A1 * | 3/2013 | Mihelic | G06F 1/12 713/401 |

(Continued)

FOREIGN PATENT DOCUMENTS

| EP | 2770678 A1 | 8/2014 |
|---|---|---|
| JP | 2014165581 A | 9/2014 |

OTHER PUBLICATIONS

Lipinski et al., "White rabbit: a PTP application for robust sub-nanosecond synchronization", pp. 25-30, Published in: Precision Clock Synchronization for Measurement Control and Communication (ISPCS), 2011 International IEEE Symposium, Date of Conference:Sep. 12-16, 2011, DOI:10.1109/ISPCS.2011.6070148, IEEE Xplore Abstract.

(Continued)

*Primary Examiner* — Min Jung
(74) *Attorney, Agent, or Firm* — Yuanmin Cai, Esq.

(57) ABSTRACT

A method for determining a slave clock to master clock time difference with an alignment marker. The method selects and transmits a first alignment marker at a first time by a transmitter that has a master clock in a first message to a receiver that has a slave clock. Subsequent to transmitting the first message, the method further transmits a second message that contains the first time and an identity of the first alignment marker. The method further receives the first (Continued)

message and records a second time that the first message is received. The method further receives the second message and the first time and the identity of the first alignment marker. The method further determines a transmission delay and generates a time difference from the slave clock to the master clock.

20 Claims, 5 Drawing Sheets

(56) References Cited

U.S. PATENT DOCUMENTS

| | | | |
|---|---|---|---|
| 2014/0079409 A1* | 3/2014 | Ruffini | H04J 3/065 398/154 |
| 2014/0092918 A1 | 4/2014 | Jost | |
| 2015/0381339 A1* | 12/2015 | Basso | H04L 7/0037 370/518 |
| 2016/0020978 A1* | 1/2016 | Giannakopoulos | H04L 43/12 370/252 |
| 2016/0043823 A1* | 2/2016 | Zhao | H04J 3/0697 370/350 |
| 2016/0080138 A1* | 3/2016 | Biederman | H04L 7/0037 375/354 |
| 2016/0112182 A1* | 4/2016 | Karnes | H04J 3/0697 375/362 |
| 2016/0170440 A1* | 6/2016 | Aweya | H04L 69/28 713/503 |
| 2016/0182175 A1* | 6/2016 | Landau | H04L 12/12 370/514 |
| 2016/0337114 A1* | 11/2016 | Baden | H04L 7/0037 |

OTHER PUBLICATIONS

Gong et al. "Sub-Nanosecond Timing System Design and Development for LHAASO Project*" WEBHMULT04, Proceedings of ICALEPCS2011, Grenoble, France, pp. 646-649, *Work supported by Tsinghua University under collaboration with White Rabbit project (CERN) and National Science Foundation of China (No. 11005065).

* cited by examiner

SUB-NANOSECOND DISTRIBUTED CLOCK SYNCHRONIZATION USING ALIGNMENT MARKER IN ETHERNET IEEE 1588 PROTOCOL

BACKGROUND OF THE INVENTION

The present invention relates generally to the field of distributed systems and more particularly to the precision of a time synchronization in a distributed system that uses the IEEE Standard for a Precision Clock Synchronization Protocol for Networked Measurement and Control Systems (IEEE 1588-2008).

IEEE 1588-2008, also known as Precision Time Protocol (PTP), is a protocol standard to synchronize real-time clocks in the nodes of a distributed system that communicate using a network. This standard defines a protocol that enables precise synchronization of clocks in measurement and control systems implemented with technologies such as network communication, local computing, and distributed objects. The protocol is applicable to systems communicating by local area networks supporting multicast messaging including, but not limited to, Ethernet. The protocol enables heterogeneous systems that include clocks of various inherent precision, resolution, and stability to synchronize to a master clock. The protocol supports system-wide synchronization accuracy in the sub-microsecond range with minimal network and local clock computing resources. The standard permits synchronization accuracies to better than 1 ns. IEEE 1588-2008 is primarily designed for local systems requiring accuracies beyond those attainable using Network Time Protocol which can achieve an accuracy from one millisecond to tens of milliseconds. It is also appropriate for applications that cannot bear the cost of a GPS receiver at each synchronized node, or for which GPS signals are not accessible.

Ethernet structures and protocols are continually enhanced to accommodate the need for ever-faster communications and increasingly accurate synchronization in distributed systems. For example, fiber optic communications, which enables fast, high bandwidth, communication over long distances via modulated light waves carried in nearly transparent fibers, have been incorporated into Ethernet-based communication links. Often a fiber optic Ethernet connection will accommodate four or more "optical lanes" of communication simultaneously. Four or more frequencies can be used simultaneously in one optical fiber to carry four or more data streams. These optical lanes are often the conduits for information from many more "electrical lanes", of communication over the Ethernet connection. The electrical lanes can be shared by "virtual lanes" of communication. A few optical lanes are shared by many more virtual lanes. The number of virtual lanes is usually the least common multiple of the number of electrical lanes and the number of optical lanes. Data being transferred on a specific virtual lane is assigned to one specific optical lane, but that optical lane is shared (multiplexed) among many virtual lanes so that the data on an optical lane (from a given virtual lane) is usually interspersed with data from other virtual lanes on that same optical lane.

Measurement and control applications, which require accurate timing and synchronization, are increasingly employing distributed system technologies such as network communication, local computing, and distributed objects. Many of these applications are enhanced by having an accurate system-wide sense of time achieved by having local clocks in each sensor, actuator, or other system device. The improvement of the accuracy and granularity (smallest visible time duration) of distributed clocks in such systems is an active area of research.

SUMMARY

A method for determining a slave clock to master clock time difference with an alignment marker. The method selects an alignment marker by a transmitter that has a master clock to provide a first alignment marker. The method further transmits at a first time, by the transmitter, the first alignment marker in a first message to a receiver that has a slave clock. Subsequent to transmitting the first message, the method further transmits a second message to the receiver that contains the first time and an identity of the first alignment marker. The method further receives, by the receiver, the first message and recording a second time that the first message is received. The method further receives, by the receiver, the second message and the first time and the identity of the first alignment marker. The method further identifies the first alignment marker in the receiver with the identity of the first alignment marker. The method further determines, in the receiver, a delay associated with data transmission between the receiver and the transmitter. The method further generates, in the receiver, a time difference from the slave clock to the master clock from the delay, the first time, and the second time.

DETAILED DESCRIPTION

Figure 1:
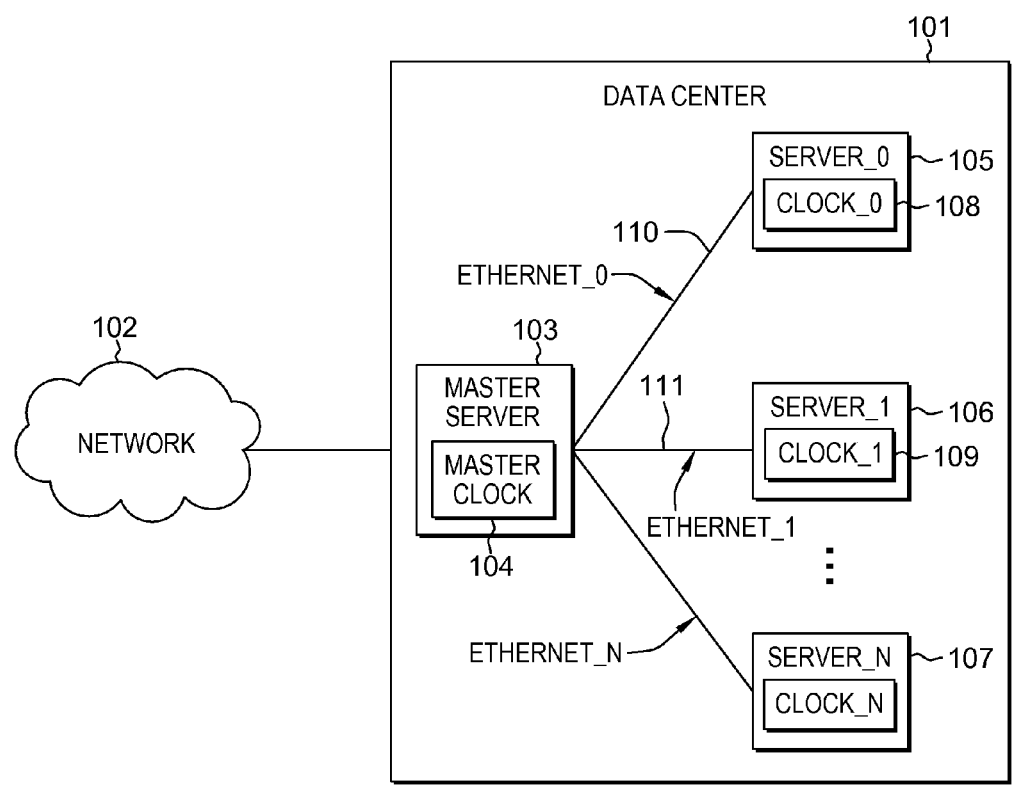
FIG. 1 depicts a block diagram of a data center attached to a network, in accordance with an embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The Physical Coding Sublayer (PCS) is a sublayer in Ethernet networking protocol standards that specifies how this multiplexing from virtual lanes (called PCS lanes in the protocol) to electrical lanes to optical lanes is performed at the transmitting end and how the demultiplexing is performed at the receiving end of an Ethernet link. The PCS sublayer is one of several protocol layers in the Open System Interconnection model.

The Open System Interconnection (OSI model) is an internationally accepted communication model that is commonly followed in communication standards. It groups communication functions into seven logical layers. A given layer provides services to the layer above it and is provided services by the layer below it. For example, a layer that provides error-free communications across a network provides the path needed by applications above it, while it calls the next lower layer to send and receive packets that make up the contents of that path. The bottom two layers are the data link layer (layer 2) and the physical layer (layer 1). The data link layer is composed of two sublayers, the lower media access control sublayer (MAC sublayer) and the upper logical link control (LLC) sublayer. The PHY layer consists of a physical medium dependent (PMD) sublayer, a physical medium attachment (PMA) sublayer, a physical coding sublayer (PCS), and a forward error correction (FEC) sublayer.

The PCS layer in a transmitting device communicates with the PCS layer in the receiving device to execute data transfers in an expeditious, organized, and reliable manner. The PCS layer and the PMA layer are responsible for data encoding/decoding, scrambling/descrambling, alignment marker insertion/removal, block and symbol redistribution, and lane block synchronization and deskew. Due to skew on the electrical interface to a fiber optic link (different paths through the interface experience various delays at various times) and the random startup state of the logic, it is in not predictable when and where a block of data in a PCS lane will end up in the receive PCS. To that end, alignment markers (66-bit blocks, unique to each lane) are inserted in a PCS lane at regular time intervals to provide the means by which the receive PCS identifies and reorders the individual PCS lanes.

Distributed systems often require precise synchronization among physically separated components that communicate over an Ethernet. Distributed control applications, many defense-related applications, and collaborative distributed optical and radio telescopes are examples of distributed systems that require precise synchronization. Embodiments of the present invention recognize that an enhanced precision of a synchronization of a slave clock to a master clock can be obtained with a synchronization technique that exploits functionality in the PHY layer of an Ethernet connection, the lowest layer in the OSI protocol model and the layer that interfaces with the physical medium that transports signals.

In a typical distributed system, a master clock in a master computer is used as a standard with which to synchronize other clocks (slave clocks) that are in various computers connected to the master computer. For example, in a data center, the slave clocks in a plurality of servers would be synchronized to a master clock in a master server. Applications that require precise synchronization that run on distributed systems that employ the IEEE 1588-2008 protocol, also known as Precision Time Protocol (PTP), acquire a time from a local clock that is synchronized to a master clock (the master time). Precision time protocol (PTP) messages are exchanged between the node that contain the master clock and the node containing the local clock that synchronize the local clock to the master clock. An exchange of PTP messages between the nodes transmits the current master time to the receiver and enables the link delay, i.e., the delay on the link from transmission to reception of a message, to be determined. The time (according to the local clock at the receiver) that the master time is received is recorded at the receiver. Because time has passed since the master time was transmitted (by the transmitter) by the amount of delay in the link, the delay in the link and the master time received are summed. If the local clock and the master clock are synchronized, then this sum should equal the local time at which the master time was received by the receiver, and if not, then the local clock is adjusted by the difference to synchronize it with the master clock. Embodiments of the present invention recognize that to achieve a precise synchronization, the identification and transmission (to the slave) of the master time of an instance of a periodic event (in the master) that has a high, stable, repetition rate is beneficial. Embodiments of the present invention recognize that the periodic event should occur in close proximity to the physical medium (that connects the master and the slave) to minimize logic delays in the path between the detection and transmission of the event in the master node and the detection of the transmitted event in the slave node.

FIG. 1 depicts data center 101 that, in some scenarios and embodiments, includes master server 103 and distributed servers: server_0 105, server_1 106, and additional servers through server_N 107. In an embodiment, server_0 105 contains clock_0 108 and is connected to master server 103 with Ethernet_0 110. Server_1 contains clock_1 109 and is connected to master server 103 with Ethernet_1 111. Master server 103 contains master clock 104 and is connected to network 102 and to distributed servers: server_0 105, server_1 106, and additional servers through server_N 107. The time on master clock 104 is used as a standard time with which to synchronize other clocks in data center 101. For example, clock_0 108 in server_0105 is synchronized to master clock 104 in master server 103.

Figure 2:
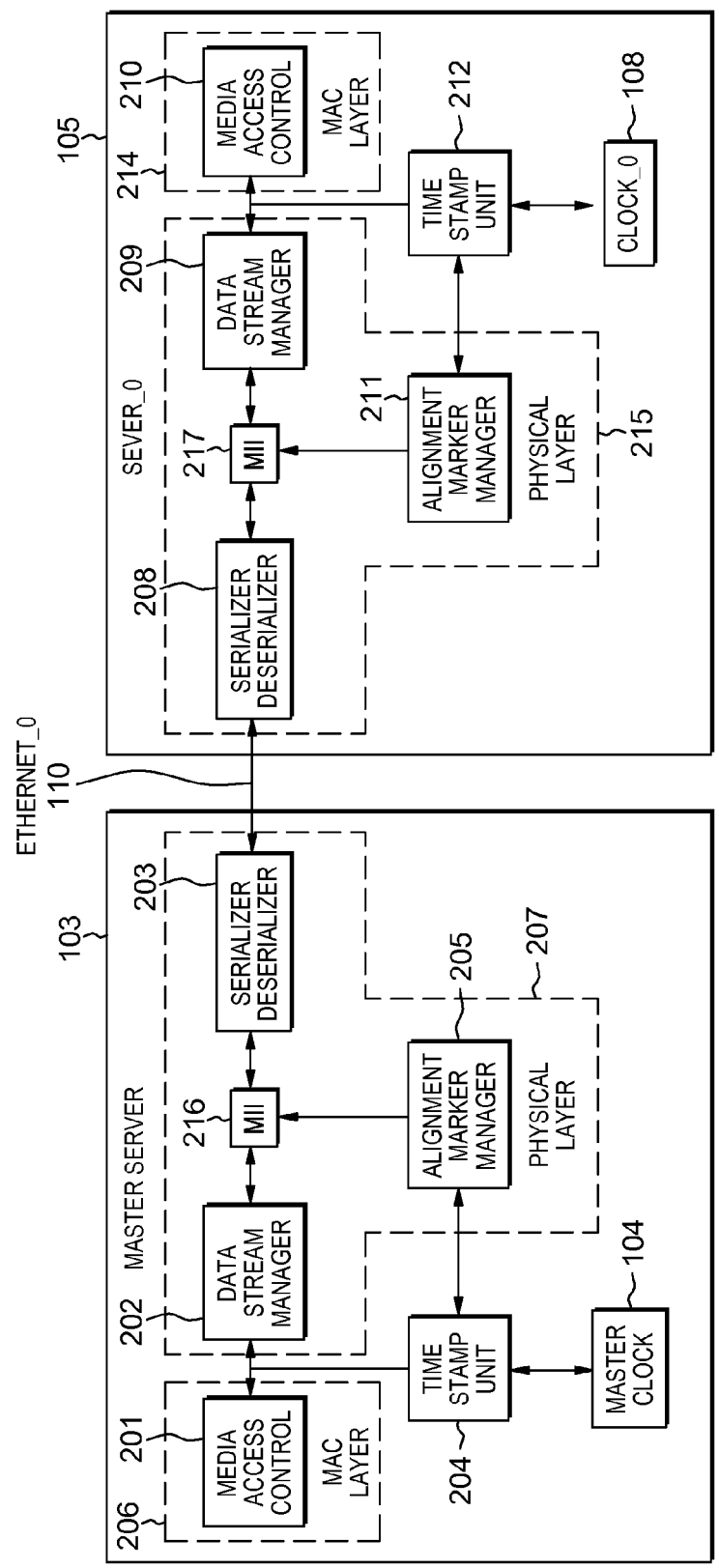
FIG. 2 depicts a block diagram of a master server that contains a master clock and a server that contains a clock synchronized to the master clock in the data center depicted in FIG. 1, in accordance with an embodiment of the present invention.

FIG. 2 depicts the functions in master server 103 and server_0 105 in more detail. In some scenarios and embodiments, master server 103 is comprised of media access control (MAC) 201 in MAC layer 206, data stream manager 202, media independent interface (MII) 216, serializer deserializer 203, and alignment marker manager 205 in physical layer 207, and time stamp unit 204 and master clock 104. In some scenarios and embodiments, server_0105 is comprised of media access control (MAC) 210 in MAC layer 214, data stream manager 209, media independent interface (MII) 217, serializer deserializer 208, and alignment marker manager 211 in physical layer 215, and time stamp unit 212, and clock_0 108.

The MAC sublayer in the OSI model of computer networking provides an interface between the logical link control sublayer and the network's physical layer. A data packet on an Ethernet link is called an Ethernet packet, which transports an Ethernet frame as a payload. An Ethernet frame contains destination and source MAC addresses, data, and information that is used to detect errors in the frame after transmission. The MAC layer is responsible for Ethernet frame delimiting and recognition and error checking, among other functions. In the OSI model, an OSI layer of function in a computer node communicates with a matching OSI layer of function in another computer node. In an embodiment, media access control 201 in MAC layer 206 in master server 103 communicates with media access control 210 in MAC layer 214 in server_0 105 and media access control 210 in MAC layer 214 in server_0 105 communicates with media access control 201 in MAC layer 206 in master server 103.

In some scenarios and embodiments, data stream manager 202 in master server 103 contains functions that include the physical coding sublayer (PCS) which is responsible for data encoding/decoding, scrambling/descrambling, alignment marker insertion/removal, block and symbol redistribution, and virtual lane block synchronization and deskew. Data stream manager 202 serves as an interface between media access control 201 (MAC layer) and media independent interface (MII) 216. Data stream manager 202 manages the input and output of blocks of information (66-bits to a block) on a plurality of virtual lanes of communication in and out of master server 103 on Ethernet_0 110. The blocks in the virtual lanes of communication are multiplexed onto physical lanes of communication that Ethernet_0 110 provides. Each physical lane of communication on Ethernet_ 110 carries bit-serial information, i.e., a sequence of bits is transmitted one bit at a time in a physical lane. Serializer deserializer 203 receives input on bit-parallel buses from MII 216 and converts the bit-parallel input to a bit serial output that is asserted on Ethernet_0 110. Likewise, bit-serial input from Ethernet_0 110 to serializer deserializer 203 is converted to a bit-parallel output to MII 216.

In some scenarios and embodiments, data stream manager 209 in server_0 105 contains functions that include the physical coding sublayer (PCS) which is responsible for data encoding/decoding, scrambling/descrambling, alignment marker insertion/removal, block and symbol redistribution, and lane block synchronization and deskew. Data stream manager 209 serves as an interface between media access control 210 (MAC layer) and MII 217 (media independent interface). Data stream manager 209 manages the input and output of blocks of information on a plurality of virtual lanes of communication in and out of server_0 105 on Ethernet_0 110. The blocks in the virtual lanes of communication are multiplexed onto physical lanes of communication that Ethernet_0 110 provides. A physical lane, for example, can be provided by a specific frequency of light in a fiber optic cable. Serializer deserializer 208 receives input from MII 217 on bit-parallel buses and converts the bit-parallel input to a bit-serial output that is asserted on Ethernet_0 110. Likewise, bit-serial input from Ethernet_0 110 to serializer deserializer 208 is converted to a bit-parallel output to MII 217.

In an embodiment, Ethernet_0 110 provides four concurrent physical lanes of communication onto which a plurality of virtual lanes of communication are multiplexed. The information in a given virtual lane is usually asserted on a single physical lane and reassembled into the original virtual lane at the receiving node. Data stream manager 202 periodically inserts a lane-specific alignment marker into the data stream of each virtual lane. In an embodiment, an alignment marker is inserted into a given virtual lane every 16384 blocks in the virtual lane. In an embodiment, every alignment marker inserted into a given virtual lane is comprised of at least two bit-fields. One bit-field identifies the virtual lane to which the alignment marker belongs and a second bit-field aids in the detection of sequence problems among the blocks that are received in a virtual lane. In an embodiment, this bit-field is called TX_AM_VALID. The bit-pattern in TX_AM_VALID alternates between two specified values in a sequence of alignment markers that are inserted in a given virtual lane. Embodiments of the present invention recognize that a value of TX_AM_VALID identifies a unique alignment marker until the value is repeated in a following alignment marker (i.e., during the time it takes to transmit 32768 blocks).

In IEEE Standard for a Precision Clock Synchronization Protocol for Networked Measurement and Control Systems (IEEE 1588-2008), an alignment marker is used by the receiving node to map received blocks into the virtual lanes that they belong to and to realign the blocks into chronological order (their order in a virtual lane prior to transmission) in all the virtual lanes. Blocks transferred in a physical lane do not incorporate an identification as to which virtual lane they belong. The order in which they appear in a physical lane at the receiver is used to identify the virtual lane to which they belong. Because a variation in various delays (e.g., logic delays) can skew the arrival time of a block, the alignment markers are used to help identify the virtual lane to which a block belongs and to verify that received blocks are being assigned to the correct virtual lanes.

Special blocks that are used to manage communications and synchronization are self-identifying. These blocks include alignment markers (which contain a virtual lane identifier to which they belong) and blocks that are used to synchronize a slave clock to the master clock. The special blocks used for clock synchronization include blocks that transmit a master time from master server 103 to server_0 105 slave and blocks that enable link delays (across Ethernet_0 110) to be determined. When server_0 105 receives a block that includes a master time, server_0 must determine the delay that occurred from the insertion of the master time into the block to the reception of the master time by server_0. This delay includes logic delays in master server 103 and server_0 105 and transmission delay across Ethernet_0 110. This delay is added to the master time received (that has not advanced since its value was inserted into the block) to calculate the current time in server_0 according to master clock 104. If the calculated current time in server_0 does not match the time on server clock_0 108, then clock_0 108 is adjusted to the calculated current time.

In some scenarios and embodiments, a synchronization of clock_0 in server_0 105 to master clock 104 in master server 103 includes a tracking of a selected alignment marker that is sent from master server 103 to server_0 105. Data stream manager 202 periodically inserts an alignment marker into each virtual lane to help to assign blocks to virtual lanes in server_0 105. Alignment marker manager 205 selects an alignment marker in MII 216 in virtual lane 0 to be used for a clock synchronization from the sequence of alignment markers that are periodically inserted into virtual lane 0 by data stream manager 202.

Figure 3:
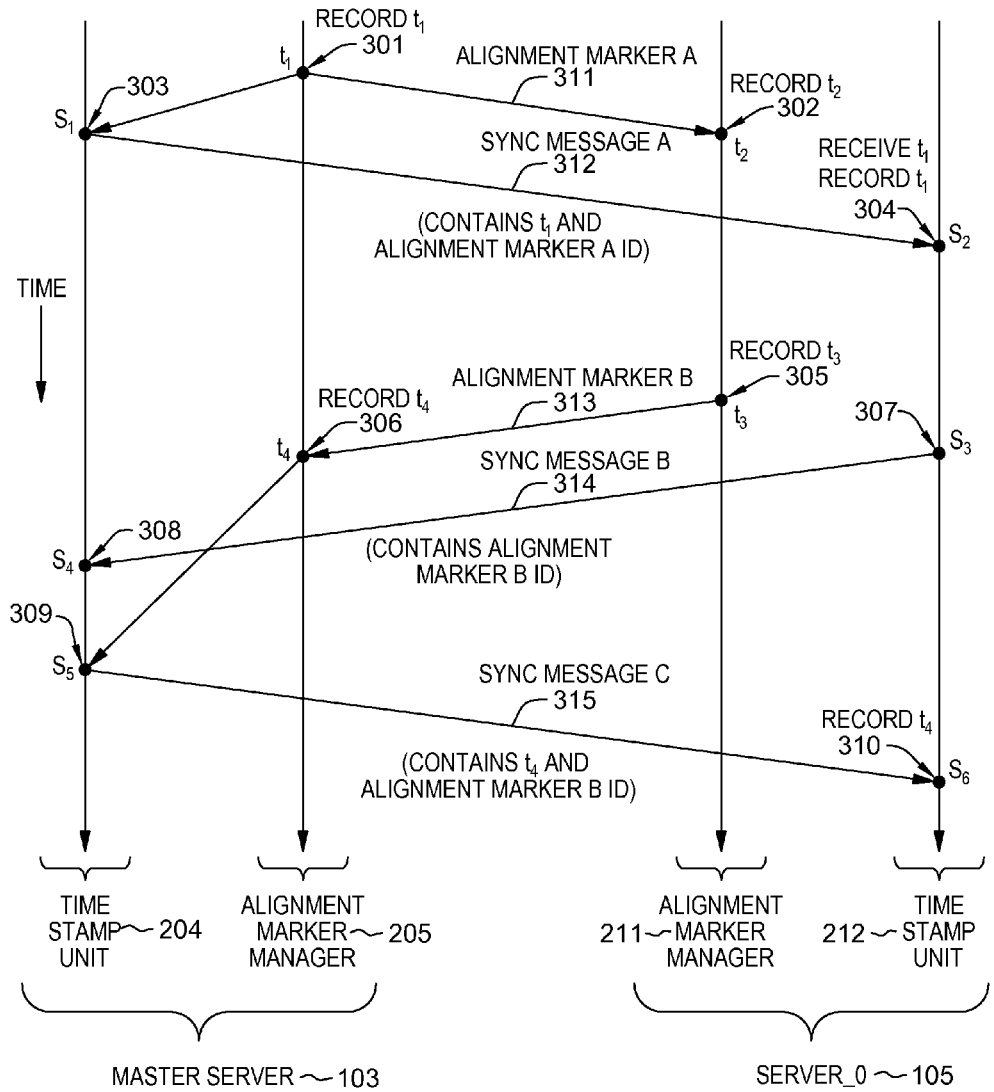
FIG. 3 depicts a timing diagram of communications for a clock synchronization operation between the servers depicted in FIG. 2, in accordance with an embodiment of the present invention.

FIG. 3 depicts a timing diagram of an exchange of blocks between master server 103 and server_0 105 over Ethernet_0 110 which together effect, in some scenarios and embodiments, a synchronization of clock_0 108 to master clock 104.

In an embodiment, alignment marker manager 205 records the time (according to master clock 104), $t_1$ 301, that the selected alignment marker (alignment marker A 311)

exits MII 216 and enters serializer deserializer 203 for transmission over Ethernet_0 110 to server_0 105. Alignment marker manager 205 also records the value of TX_AM_VALID in alignment marker A 311. Alignment marker manager 205 sends $t_1$ 301 and the value of TX_AM_VALID to time stamp unit 104. Time stamp unit 204 includes $t_1$ 301 and the value of TX_AM_VALID in a special self-identifying block (sync message A 312) that is input to data stream manager 202 at time $s_1$ 303 for transmission to server_0 105. Therefore, sync message A 312 has $t_1$ and the value of TX_AM_VALID recorded within it.

In some scenarios and embodiments, alignment marker A 311 is received by serializer deserializer 208 in server_0 105 and is converted into a bit-parallel block that is input to MII 217, where alignment marker manager 211 identifies it as an alignment marker. Alignment marker manager 211 records the time (according to clock_0 108) when alignment marker A 311 was detected in MII 217, $t_2$. Before alignment marker manager 211 receives another alignment marker, sync message A 312 arrives in MII 217 at time $t_2$ 302. The arrival of sync message A 312 that carries a TX_AM_VALID value that matches that of alignment marker A 311 serves to notify alignment marker manager 211 that alignment marker A 311 is the initiation of a clock synchronization, i.e., the synchronization of clock_0 108 to master clock 104. Sync message A 312 is seen by alignment marker manager 211 as sync message A 312 propagates to time stamp unit 212 at time s2 304. In an embodiment, alignment marker manager 211 extracts $t_1$ from sync message A 312, records $t_1$ and sends $t_1$ and $t_2$ to timestamp unit 212.

In some scenarios and embodiments, after alignment manager 211 receives sync message A 312, alignment marker manager 211 initiates an exchange of messages with master server 103 that together provide the information necessary to calculate a delay from server_0 105 to master server 103 (a link delay measurement). In an embodiment, this delay is assumed to equal the delay from master server 103 to server_0 105.

In an embodiment, alignment marker manager 211 selects an alignment marker in virtual lane 0, alignment marker B 313, and records the time (according to master clock 104), $t_3$ 305, that alignment marker B 313 exits MII 217 and enters serializer deserializer 208 for transmission over Ethernet_0 110 to master server 103. Alignment marker manager 211 also records the value of TX_AM_VALID in alignment marker B 313. Alignment marker manager 211 sends $t_3$ 305 and the value of TX_AM_VALID to time stamp unit 212. Time stamp unit 212 includes the value of TX_AM_VALID in a special self-identifying block (sync message B 314) that is input to data stream manager 209 at time $s_3$ 307 for transmission to master server 103. Therefore, sync message B 314 has the value of TX_AM_VALID for alignment marker B recorded within it.

Alignment marker B 313 is received by serializer deserializer 203 in master server 103 and is converted into a bit-parallel block that is input to MII 216, where alignment marker manager 208 identifies it as an alignment marker. Alignment marker manager 208 records the time (according to master clock 104), $t_4$ 306, at which alignment marker B 313 was detected in MII 216. Alignment marker manager 205 also records the value of TX_AM_VALID in alignment marker B 208 and sends the value of the TX_AM_VALID and $t_4$ 306 to time stamp unit 204.

In an embodiment, before alignment marker manager 205 receives another alignment marker on virtual lane 0, sync message B 314 arrives in time stamp unit 204 at time $s_4$ 308. The arrival of sync message B 314, that carries a TX_AM_VALID value that matches that of alignment marker B 313, serves to notify time stamp unit 204 that alignment marker B 314 was participating in a link delay measurement, and that the time of its arrival at alignment marker manager 205, time $t_4$, should be sent back to server_0 209 in a sync message. Therefore, time stamp unit 204 generates sync message C 315 and inserts $t_4$ and the value of TX_AM_VALID (of alignment marker B 313) into sync message C 315.

In an embodiment, time stamp unit 204 inputs sync message C 315 to data stream manager 202 at time $s_5$ 309 for transmission to server_0 105. Therefore, sync message C 315 has the value of TX_AM_VALID for alignment marker B 313 and $t_4$ recorded within it. Time stamp unit 212 receives sync message C 315 at time $s_6$ 310 and compares the value of TX_AM_VALID in sync message C 315 with the value of TX_AM_VALID for alignment marker B 313 previously received from alignment marker manager 211. If the two values are equal, then time stamp unit 212 extracts t4 from sync message C 315.

At this point, time stamp unit 212 has $t_1$ 301, $t_2$ 302, $t_3$ 305, and $t_4$ 306 and calculates the amount by which clock_0 108 must be adjusted to synchronize it with master clock 104. This amount is called the offset. In an embodiment, the offset=(t4+t1−t3−t2)/2, and clock_0 108 is adjusted by this amount.

Figure 4:
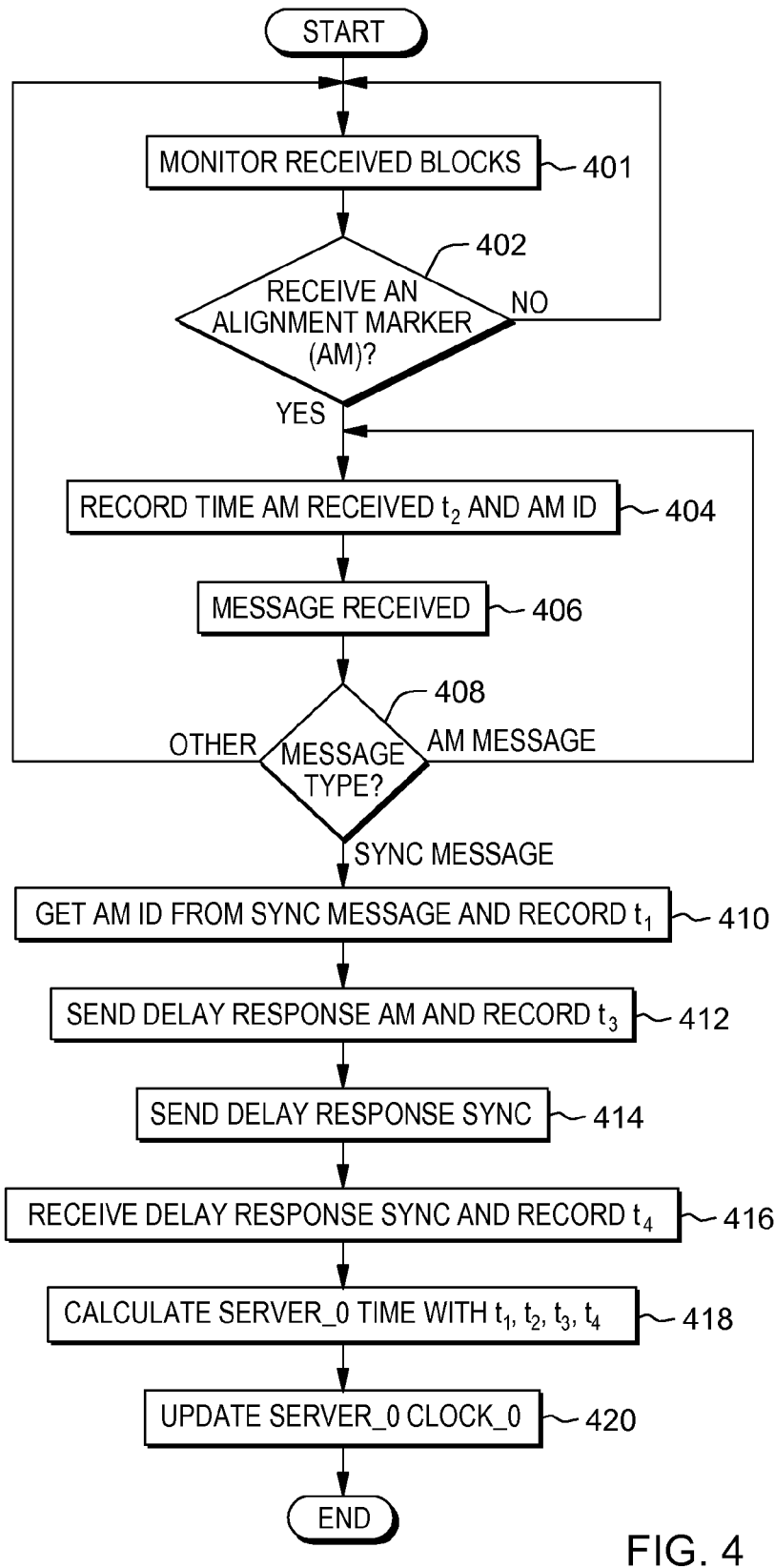
FIG. 4 depicts a flow chart, for a clock synchronization operation in accordance with an embodiment of the present invention.

FIG. 4 depicts a flowchart of the operational steps performed by server 105 during a synchronization of clock_0 108 to master clock 104, in some scenarios and embodiments. In the flowchart, alignment marker is denoted by "AM" and the value of TX_AM_VALID is denoted by "AM ID". Alignment manager 211 monitors blocks that have been received from Ethernet_0 110 (step 401). Alignment marker manager 211 decides if it has received an alignment marker on virtual lane 0 (decision step 402). In decision step 402, if an alignment marker on virtual lane 0 has not been received (decision step 402, NO branch), then alignment marker manager 211 continues to monitor blocks that have been received from Ethernet_0 110 (step 401). In decision step 402, if an alignment marker on virtual lane 0 has been received (decision step 402, YES branch), then alignment marker manager 211 records and sends the current time, $t_2$ 302, (according to clock_0 108) and the value of TX_AM_VALID (the AM ID) in the alignment marker, to time stamp unit 212 (step 404). Alignment marker manager 211 detects a message (a non-data block) (step 406). Alignment marker 211 determines the type of the message (decision step 408). If the message is an alignment marker (decision step 408, AM MESSAGE branch), then alignment marker manager 211 records and sends the current time, $t_2$ 302, (according to clock_0 108) and the value of TX_AM_VALID (the AM ID) in the alignment marker, to time stamp unit 212 (step 404). If the message is not an AM message and the message is not a sync message (decision step 408, OTHER branch), then alignment marker manager 211 continues to monitor received blocks (step 401). If the message is a sync message (decision step 408, SYNC MESSAGE branch), then time stamp unit 212 alignment marker manager 211 records and sends the time that is recorded in the sync message ($t_1$ 301) and the value of TX_AM_VALID (the AM ID) in the sync message, to time stamp unit 212 (step 410). Time stamp unit 212 determines that it has previously received the same AM ID with $t_1$ 301 and instructs alignment marker manager 211 to send a delay response AM (alignment marker B 313) to master server 103, to record the time that it was sent, $t_3$, and to send $t_3$ and the AM ID of alignment marker B 313 to time stamp unit 212 (step 412). Time stamp unit 212 sends a sync message (sync message B 314) to master server 103 that has the AM ID of alignment marker B 313 (step 414). Time stamp unit 212 receives a response sync message from master server 103 (sync message C 315) that contains the time that alignment marker B 313 arrived in master server 103, $t_4$ (step 416). Time stamp unit 212 now contains $t_1$, $t_2$, $t_3$, and $t_4$. Time stamp unit 212 calculates the amount of time that clock_0 must be adjusted (the offset) to synchronize it with master clock 104 (step 418). In an embodiment, offset=(t4+ t1−t3−t2)/2. Time stamp unit 216 adjusts clock_0 108 by the offset to complete the synchronization of clock_0 108 to master clock 104 (step 420).

Figure 5:
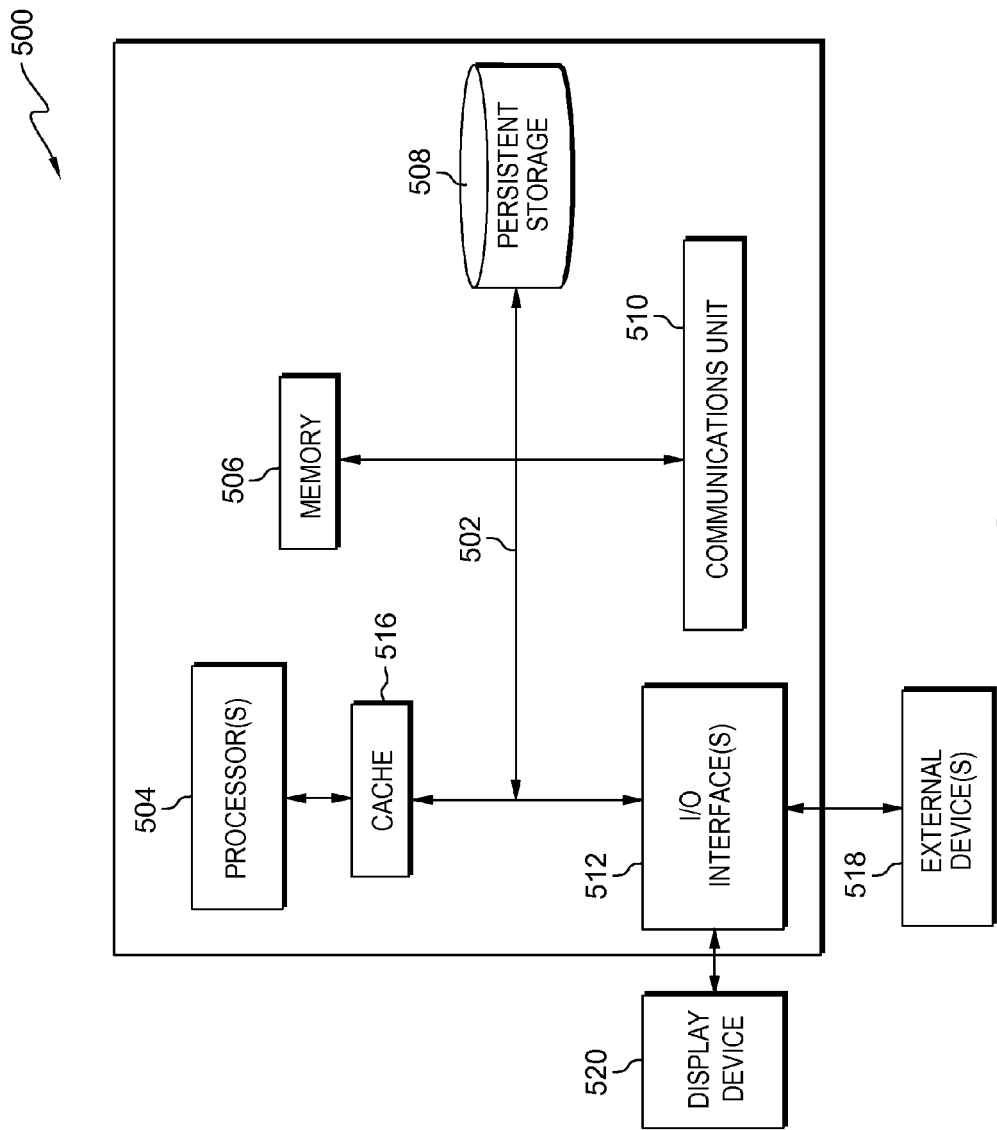
FIG. 5 depicts a block diagram of a computer system, that hosts a server in the data center depicted in FIG. 1, in accordance with an embodiment of the present invention.

FIG. 5 depicts computer system 500 that is an example of a computer system that hosts the functions of server_0 105 in data center 101. Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory. In general, memory 506 can include any suitable volatile or non-volatile computer readable storage media. Cache 516 is a fast memory that enhances the performance of processors 504 by holding recently accessed data and data near accessed data from memory 506.

Program instructions and data used to practice embodiments of the present invention may be stored in persistent storage 508 for execution by one or more of the respective processors 504 via cache 516 and one or more memories of memory 506. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 503 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Each respective figure, in addition to illustrating methods of and functionality of the present invention at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein.

Embodiments of the present invention may be used in a variety of electronic applications, including but not limited to advanced sensors, memory/data storage, semiconductors, microprocessors and other applications.

A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may be included by only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

What is claimed is:

1. A method for determining a slave clock to master clock time difference with an alignment marker, the method comprising:

receiving, by a processor, a first message that was sent at a first time and that includes a first alignment marker, wherein the processor has a slave clock, wherein the first alignment marker was selected by a computing device that has a master clock;

recording, by the processor, a second time that the first message was received;

receiving, by the processor, a second message that indicates the first time at which the first message was sent and an identity of the first alignment marker, wherein the second message was transmitted subsequent to the first message being transmitted;

identifying, by the processor, the first alignment marker in a receiver based, at least in part, on the identity of the first alignment marker;

determining, by the processor, a delay that is associated with data transmission between the receiver and a transmitter, the delay being determined based on information acquired during transmission of messages between the processor and the computing device; and generating, by the processor, a time difference from the slave clock to the master clock based, at least in part, on the delay, the first time, and the second time.

2. The method of claim 1, wherein the determining of the delay is comprised of:

selecting, by the processor, a second alignment marker;

transmitting, by the processor, at a third time, the second alignment marker as part of a third message to the computing device;

subsequent to transmitting the third message, transmitting, by the processor, a fourth message to the computing device that contains an identity of the second alignment marker;

receiving, by the processor, a fifth message that indicates a fourth time at which the third message was received by the computing device and the identity of the second alignment marker; and computing, by the processor, the delay using the third time and the fourth time.

3. The method of claim 2, wherein the time difference from the slave clock to the master clock is calculated as $(t_4+t_1-t_3-t_2)/2$, where $t_1$ is the first time, $t_2$ is the second time, $t_3$ is the third time, and $t_4$ is the fourth time.

4. The method of claim 1, wherein the first alignment marker is in virtual lane 0.

5. The method of claim 2, wherein the first alignment marker and the second alignment marker are in virtual lane 0.

6. The method of claim 1, wherein the second message is a sync message.

7. The method of claim 2, wherein the second message, the fourth message, and the fifth message are sync messages.

8. A computer program product for determining a slave clock to master clock time difference with an alignment marker, the computer program product comprising:

one or more computer readable storage media and program instructions stored on the one or more computer readable storage media and executable by a processor, the program instructions comprising:

program instructions to receive a first message that was sent at a first time and that includes a first alignment marker, wherein the processor has a slave clock, wherein the first alignment marker was selected by a computing device that has a master clock;

program instructions to record a second time that the first message was received;

program instructions to receive a second message that indicates the first time at which the first message was sent and an identity of the first alignment marker, wherein the second message was transmitted subsequent to the first message being transmitted;

program instructions to identify the first alignment marker in a receiver based, at least in part, on the identity of the first alignment marker;

program instructions to determine a delay in the receiver that is associated with data transmission between the receiver and a transmitter, the delay being determined based on information acquired during transmission of messages between the processor and the computing device; and program instructions to generate a time difference from the slave clock to the master clock based, at least in part, on the delay, the first time, and the second time.

9. The computer program product of claim 8, wherein the program instructions to determine the delay are comprised of:

program instructions to select a second alignment marker;

program instructions to transmit at a third time, the second alignment marker as part of a third message to the computing device;

program instructions to, subsequent to transmitting the third message, transmitting, a fourth message to the computing device that contains an identity of the second alignment marker;

program instructions to receive a fifth message that indicates a fourth time at which the third message was received by the computing device and the identity of the second alignment marker; and program instructions to compute the delay using the third time and the fourth time.

10. The computer program product of claim 9, wherein program instructions calculate the time difference from the slave clock to the master clock as $(t_4+t_1-t_3-t_2)/2$, where $t_1$ is the first time, $t_2$ is the second time, $t_3$ is the third time, and $t_4$ is the fourth time.

11. The computer program product of claim 8, wherein the first alignment marker is in virtual lane 0.

12. The computer program product of claim 9, wherein the first alignment marker and the second alignment marker are in virtual lane 0.

13. The computer program product of claim 8, wherein the second message is a sync message.

14. The computer program product of claim 9, wherein the second message, the fourth message, and the fifth message are sync messages.

15. A computer system for determining a slave clock to master clock time difference with an alignment marker, the computer system comprising:

one or more computer processors, one or more computer readable storage media, and program instructions stored on the computer readable storage media for execution by a processor of the one or more processors, the program instructions comprising:

program instructions to receive a first message that was sent at a first time and that includes a first alignment marker, wherein the processor has a slave clock, wherein the first alignment marker was selected by a computing device that has a master clock;

program instructions to record a second time that the first message is received;

program instructions to receive a second message that indicates the first time at which the first message was sent and an identity of the first alignment marker, wherein the second message was transmitted subsequent to the first message being transmitted;

program instructions to identify the first alignment marker in a receiver based, at least in part, on the identity of the first alignment marker;

program instructions to determine a delay that is associated with data transmission between the receiver and a transmitter, the delay being determined based on information acquired during transmission of messages between the processor and the computing device; and program instructions to generate a time difference from the slave clock to the master clock based, at least in part, on the delay, the first time, and the second time.

16. The computer system of claim 15, wherein the program instructions to determine the delay are comprised of:

program instructions to select a second alignment marker;

program instructions to transmit at a third time, the second alignment marker as part of a third message to the computing device;

program instructions to, subsequent to transmitting the third message, transmitting, a fourth message to the computing device that contains an identity of the second alignment marker;

program instructions to receive a fifth message that indicates a fourth time at which the third message was received by the computing device and the identity of the second alignment marker; and program instructions to compute the delay using the third time and the fourth time.

17. The computer system of claim 16, wherein program instructions calculate the time difference from the slave clock to the master clock as $(t_4+t_1-t_3-t_2)/2$, where $t_1$ is the first time, $t_2$ is the second time, $t_3$ is the third time, and $t_4$ is the fourth time.

18. The computer system of claim 15, wherein the first alignment marker is in virtual lane 0.

19. The computer system of claim 16 wherein the first alignment marker and the second alignment marker are in virtual lane 0.

20. The computer system of claim 15, wherein the second message is a sync message.

* * * * *